United States Patent [19]
Furuhashi et al.

[11] Patent Number: 5,552,928
[45] Date of Patent: Sep. 3, 1996

[54] MICROSCOPE WITH MOVABLE STAGE AND OBJECTIVE FOR EXAMINING LARGE SAMPLE

[75] Inventors: Hidehiko Furuhashi, Fujisawa; Toshiaki Nihoshi, Tokyo, both of Japan

[73] Assignee: Nikon Corporation, Tokyo, Japan

[21] Appl. No.: 167,616

[22] Filed: Dec. 16, 1993

Related U.S. Application Data

[63] Continuation of Ser. No. 964,958, Oct. 22, 1992, abandoned.

[30]    Foreign Application Priority Data

Oct. 30, 1991  [JP]  Japan ................................ 3-285141

[51] Int. Cl.⁶ .................................................. G02B 21/00
[52] U.S. Cl. ........................ 359/379; 359/368; 359/391; 359/392
[58] Field of Search ...................... 359/379, 382, 359/383, 384, 391, 392, 393, 368

[56] References Cited

U.S. PATENT DOCUMENTS

| | | | |
|---|---|---|---|
| 4,676,608 | 6/1987 | Faubion | 359/393 |
| 4,744,642 | 5/1988 | Yoshinaga et al. | 359/379 |
| 4,832,474 | 5/1989 | Yoshinaga et al. | 359/392 |
| 4,834,516 | 5/1989 | Kajitani et al. | 359/382 |

*Primary Examiner*—Georgia Y. Epps
*Assistant Examiner*—Michael A. Papalas
*Attorney, Agent, or Firm*—Shapiro and Shapiro

[57] ABSTRACT

A microscope has an objective optical system coupled to an observation optical system with parallel optical axes. A stage, which holds a sample, rectilinearly moves in a direction toward and away from the observation optical axis, which is perpendicular to the plane of the stage. The objective optical system rectilinearly moves in a direction perpendicular to the movement of the stage. The microscope thus permits viewing of a large sample with a small stroke of the stage, whereby a compact and lightweight structure may be achieved.

15 Claims, 4 Drawing Sheets

MICROSCOPE WITH MOVABLE STAGE AND OBJECTIVE FOR EXAMINING LARGE SAMPLE

This is a continuation of application Ser. No. 964,958 filed Oct. 22, 1992, now abandoned.

BACKGROUND OF THE INVENTION

1. Field of the Invention

The present invention relates to a microscope to be used in testing a relatively large sample such as a large diameter wafer or a large size liquid crystal substrate.

2. Related Background Art

A prior art microscope of this type has a stage which is movable in X and Y directions to cover an area of the sample required for observation.

In such a prior art microscope, when a sample of 500 mm square is to be observed in a microscope test of a liquid crystal substrate, for example, the stage occupies an area of 1000 mm square by only the stroke of the stage, and a very large scale apparatus is required. Thus, the microscope occupies a large amount of limited factory space. Such a stage is also heavy, and the movement thereof requires a large torque. When a lower stage of the X-Y stages is to be moved, two heavy stages should be moved. Thus, if the stages are to be power-driven, high power motors are required. This also increases the size of the apparatus.

SUMMARY OF THE INVENTION

It is an object of the present invention to provide a microscope which permits the observation of a large sample, has a small stroke of a stage and is lightweight.

In accordance with the present invention, there is provided a microscope which separately drives a stage and an objective lens with respect to two orthogonal directions.

The microscope of the present invention comprises a stage which is movable in only one of X and Y directions on a plane perpendicular to an optical axis of an objective lens, and the objective lens which is movable in the other direction, and permits the observation of the entire area of the sample on the stage. Compared to the prior art apparatus which permits the movement of only the stage for the observation of the entire area of the sample, the present apparatus needs a very small movement area of the stage and occupies little floor space. Thus, more apparatuses can be used in a smaller installation space. Further, since the stage and the object lens are independently driven, the power required for the drive is small and the power consumption is reduced.

In accordance with embodiments of the present invention, an observation optical system is provided at a position spaced from the optical axis of the objective lens by a predetermined distance along a direction perpendicular to a direction of movement of the objective lens, and a relay optical system for forming a relay optical path between the objective lens and the observation optical system is provided. The relay optical system is rotated around the optical axis of the observation optical system as the objective lens is moved.

In first and second embodiments of the present invention, the relay optical system has a reflection plane for deflecting the optical axis of the objective lens toward the observation optical, system and at least one pair of relay lenses provided between the reflection plane and the observation optical system. A space between the pair of lenses forms a parallel system, and the spacing between the pair of lenses is changed as the objective lens is moved.

In a third embodiment of the present invention, the relay optical system comprises a first unit having a first reflection plane for deflecting the optical axis of the objective lens and a second reflection plane which faces and is parallel to the first reflection plane, and a second unit having a third reflection plane for deflecting the light from the second reflection plane toward the observation optical system. The first and second units are relatively rotated around the optical axis between the second and third reflection planes as the objective lens is moved.

DETAILED DESCRIPTION OF THE PREFERRED EMBODIMENTS

Figure 1:
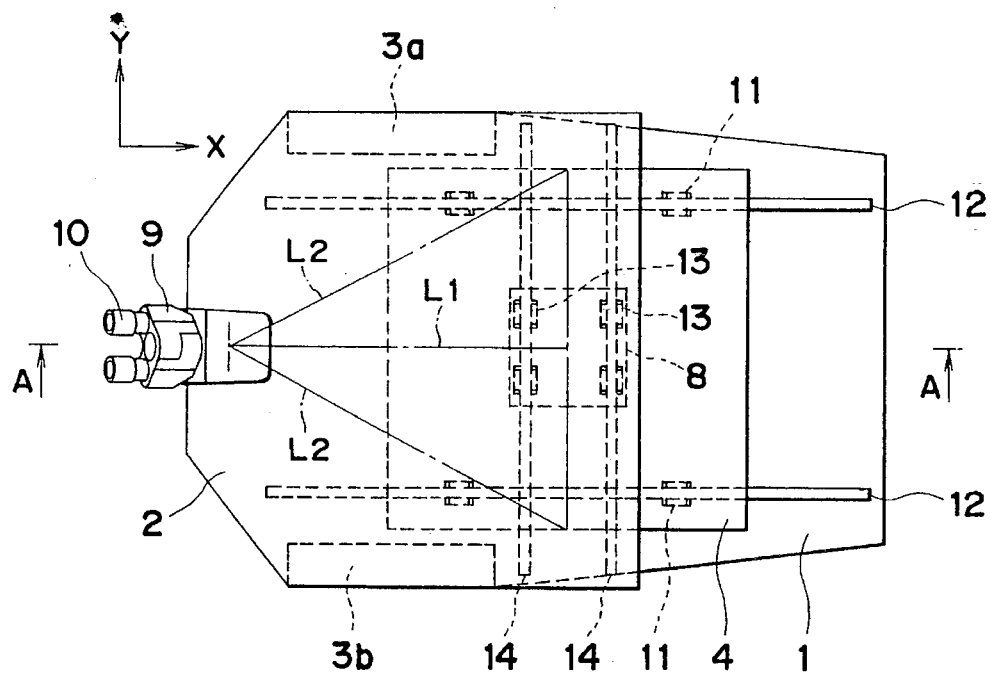
FIG. 1 shows a plan view of a first embodiment of the microscope of the present invention.

A first embodiment of the present invention is now explained with reference to FIGS. 1 and 2.

A rail 12 is fixed on a base 1, and a straight guide 11 is fixed to a bottom of the stage 4. The stage 4 is linearly moved on the base 1 in a direction to go closer to or farther from an observer who observes through an eye lens 10 mounted on an observation lens barrel 9. An objective lens is mounted at a lower end of an objective lens unit 6 which is rotatably mounted to a rotation guide 8a mounted on a bottom of a movable member 8, around the optical axis of the objective lens. A straight guide 13 is fixed to a top of the movable member 8 which is linearly moved perpendicularly to the direction of movement of the stage, by a rail 14 fixed to a bottom of a ceiling 2.

The base 1 and the ceiling 2 are linked and fixed together by support members 3a and 3b. An observation optical system unit 7 is rotatably fitted to a rotation guide 2a provided at the bottom of the ceiling 2. A plurality of relay lenses 15 and 17 are arranged in the objective lens unit 6. The light from the objective lens is deflected by a reflection mirror 16 fixed to the unit 6 and directed to the observation optical system unit 7. A plurality of relay lenses 18 and 20 are arranged in the unit 7, and a reflection mirror 19 which has a parallel reflection plane to the reflection mirror 16 is fixed. The optical axis of the relay lens 15 (the optical axis of the objective lens) coincides with a rotation axis of the objective lens unit 6, and the optical axis of the relay lens 20 (the observation optical axis) coincides with a rotation axis of the observation optical system unit 7.

An exit port of the light from the objective lens unit 6 and an incident port of the light to the observation optical system unit 7 are coupled relatively movably along the optical axis by linear guides 6a and 7a, and a space between the relay lenses 17 and 18 provided at those ports forms a parallel system with respect to an object image formed by the objective lens 5.

Figure 7:
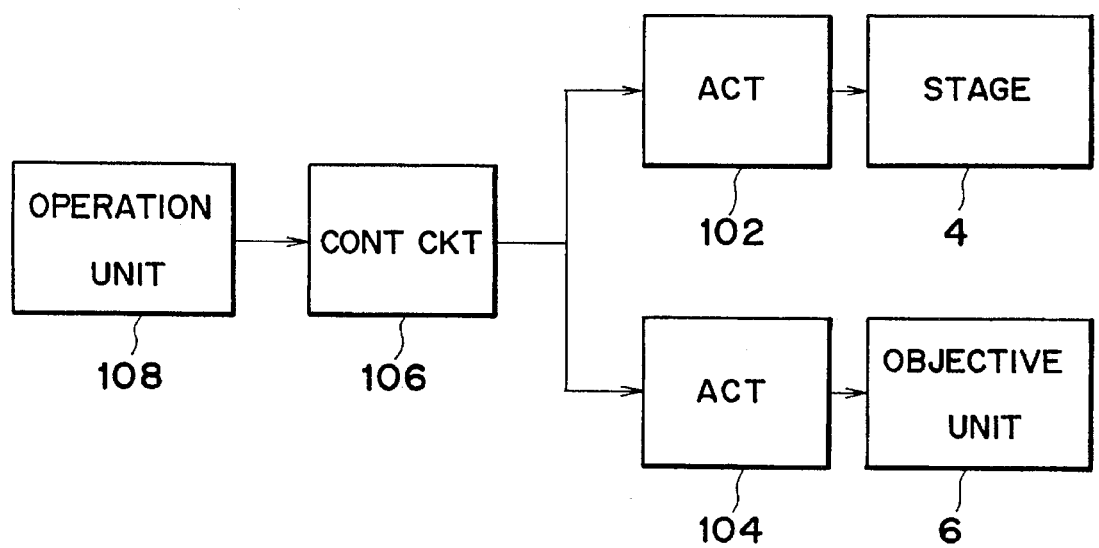
FIG. 7 shows a block diagram of a control system suitable for the respective embodiments.

A block diagram of a control system suitable to the present embodiment is shown in FIG. 7. An actuator 102 for driving the stage 4 in the X direction along the rail 12 is provided between the base 1 and the stage 4, and an actuator 104 for driving the objective lens 6 in the Y direction along the rail 14 through the movable member 8 is provided between the ceiling 2 and the movable member 8. Those actuators are equipped with electric motors, and a drive control circuit 106 for controlling the electric motors drives the electric motors in accordance with a stage drive command from a console unit 108 such as a keyboard or a joy stick or a stage drive command programmed in a computer built in the console unit 108.

An operation of the present embodiment is now explained.

When a stage drive command is issued, the drive control circuit 106 drives the X and Y direction electric motors in accordance with the displacements of the respective directions. As a result, the stage 4 is linearly driven along the rail 12 for the X direction drive of the sample, and the movable member 8 is linearly driven along the rail 14 for the Y direction drive of the sample. The area of movement is defined such that the entire sample can be observed through those drives.

Figure 2:
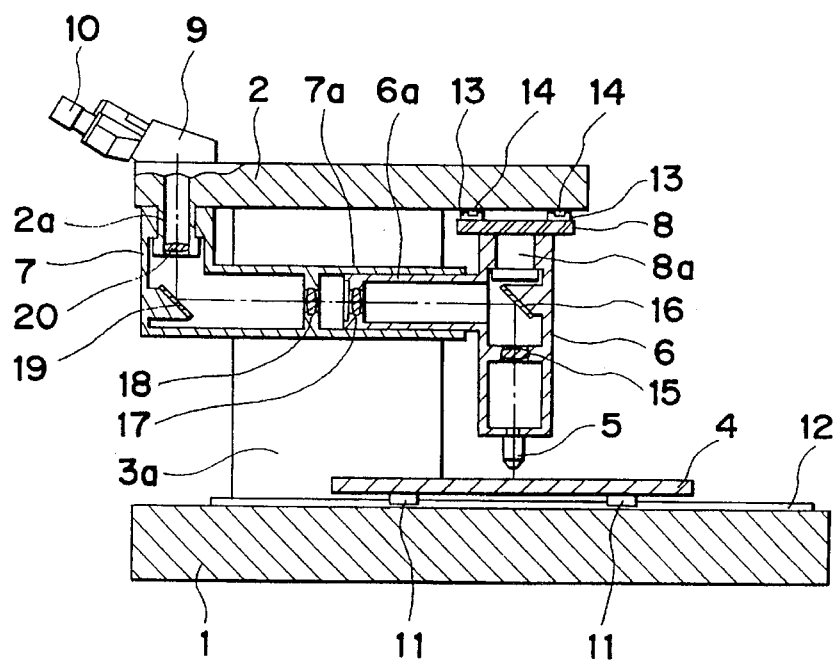
FIG. 2 shows a sectional view taken along a line A—A of FIG. 1.

As shown in FIG. 1, when the objective lens 5 is located substantially at the center of the rail 14, and optical axis distance between the object lens optical axis and the observation optical axis is equal to L1, and when the objective lens 5 is located at an upper end or a lower end of the rail 14, the optical axis distance is equal to L2. As the objective lens is driven in the Y direction, the optical axis distance changes but the space between the relay lenses 17 and 18 is maintained as the parallel system by the rotation of the reflection mirrors 16 and 19 due to the rotation guides 8a and 2aand the relative movement in the linear guides 6a and 7a. The distance between the relay lenses 17 and 18 changes with the change of the optical path length between the optical axes (L2 - L1), but because of the parallel system with respect to the object image, the defocusing or the change of magnification factor does not occur and the entire sample can be observed under the same condition.

While an illumination system is not shown, a reflection illumination device may be directly mounted on the objective lens unit 6 so that it is driven in union with the objective lens, or the illumination system of the configuration described above may be employed. A transmission illumination device may be provided in the base 1 in such a manner that it is driven in the Y direction together with the movement of the objective lens unit, and an illumination window extending along the Y direction may be provided in the base 1 at a position facing the drive range of the objective lens 5 so that the entire observation area of the stage 4 is light transmissive.

Figure 3:
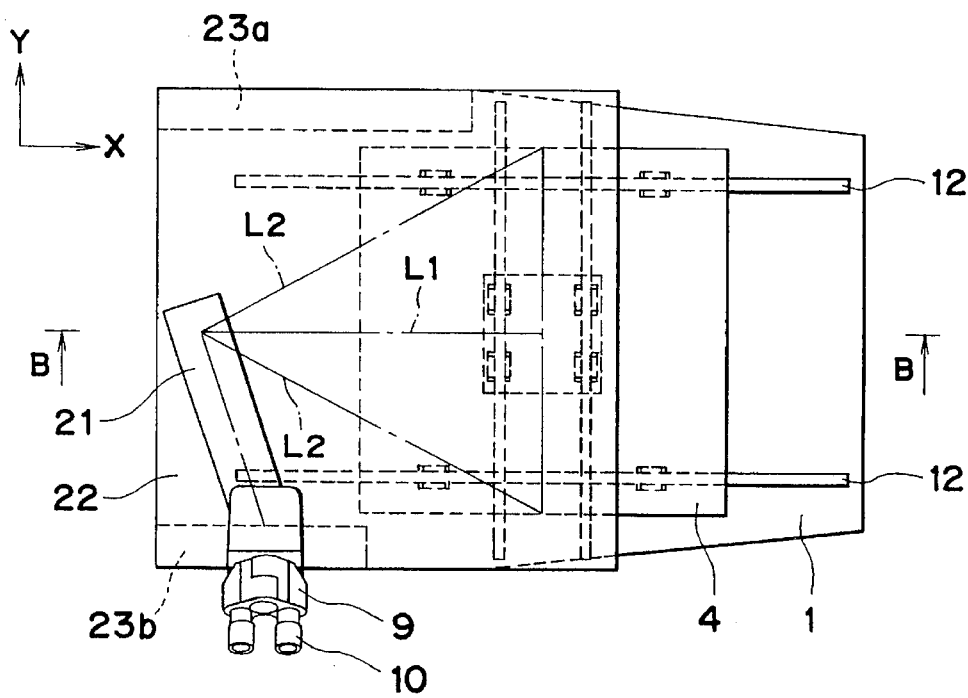
FIG. 3 shows a plan view of a second embodiment of the microscope of the present invention.
Figure 4:
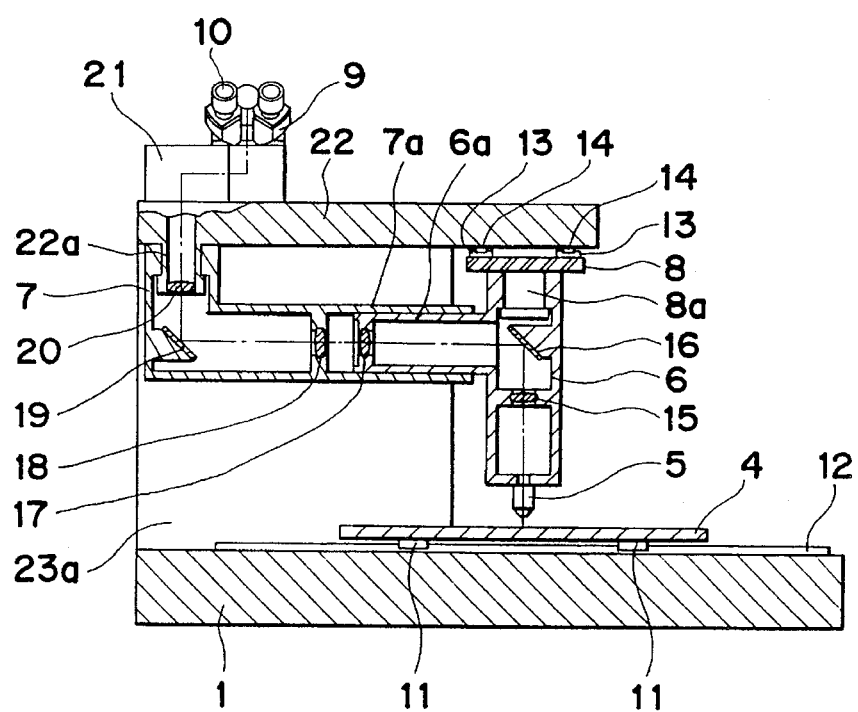
FIG. 4 shows a sectional view taken along a line B—B of FIG. 3.

FIGS. 3 and 4 show a second embodiment of the present invention, in which the elements having like functions as those of the first embodiment are designated by the same numerals.

In the second embodiment, the stage 4 is driven left and right with respect to the observer. To this end, an optical unit 21 including a relay lens and a reflection mirror, not shown, is provided between an observation lens barrel and the observation optical system unit 7. Support members 23a and 23b which couple the base 1 and the ceiling 22 are constructed such that the X direction length at a right end of the support member 23b on the observation side is shorter than that of the other support member 23a. As a result, the exchange of the sample on the stage is not impeded.

One of the first embodiment and the second embodiment may be chosen depending on a layout of the plant in which the microscope is installed.

Figure 5:
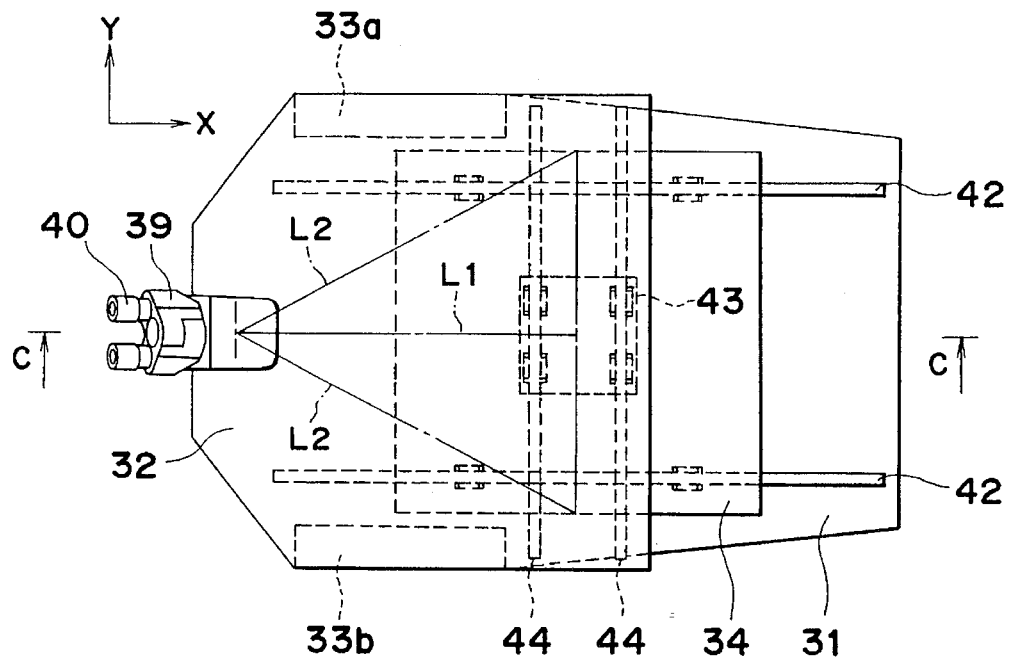
FIG. 5 shows a plan view of a third embodiment of the microscope of the present invention.
Figure 6:
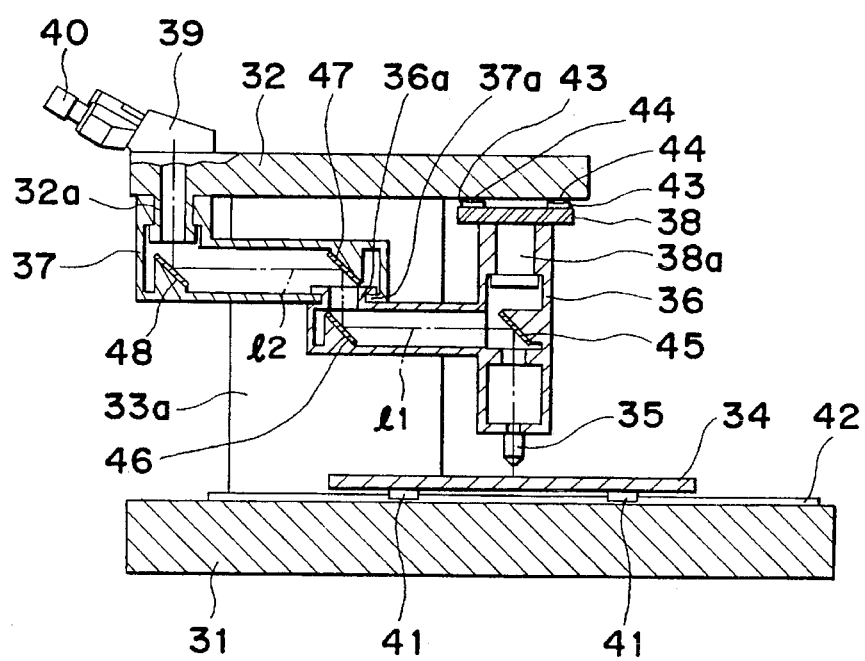
FIG. 6 shows a sectional view taken along a line C—C of FIG. 5.

FIGS. 5 and 6 show a third embodiment of the present invention.

A rail 42 which extends in the X direction is fixed on a base 31, and a stage 34 is linearly moved toward and away from an observer who observes through an observation lens barrel 39, through a straight guide 41 provided at a bottom of the stage 34. An objective lens 35 is mounted at a lower end of an objective lens unit 36 and it is rotatably mounted to a rotation guide 38a provided at a lower end of a movable member 38 of the objective lens unit 36 so that it is rotated around an optical axis of the objective lens. The movable member 38 is linearly driven in the Y direction along a rail 44 fixed to a bottom of a ceiling 32, by a straight guide 43 fixed to a top of movable member 38. A base 31 and the ceiling 32 are coupled and fixed together by support members 33a and 33b.

An observation optical system unit 37 is rotatably fitted to a rotation guide 32a provided at a bottom of the ceiling 32 to rotate around an optical axis of the observation lens barrel (observation optical axis). First and second reflection mirrors 45 and 46 are fixed in the objective lens unit 36 with parallel reflection planes and third and fourth reflection mirrors 47 and 48 are fixed in the observation optical system unit 37 with parallel reflection planes. The reflection planes of the second reflection mirror 46 and the third reflection mirror 47 are also parallel. An exit port of the light from the objective lens unit 36 and an incident port of the light to the observation optical system unit 37 are rotatably coupled by rotation guides 36a and 37a.

As explained in the first embodiment, when the objective lens 35 is located substantially at the center of the rail 44, an optical axis distance between the objective lens optical axis and the observation optical axis is equal to L1, and when the objective lens 35 is located at the upper end or the lower end of the rail 44, the optical axis distance is equal to L2. Thus, as the objective lens is driven, the distance change of (L2 - L1) occurs in the X-Y plane. In the present embodiment, this distance change is accommodated by the deflection of the optical path by the rotation of the rotation guides 36a and 37a. Namely, the system is constructed such that a sum of an optical path length l1 between the first and second reflection mirrors 45 and 46 and an optical path length l2 between the third and fourth reflection mirrors 47 and 48 is no smaller than L2 ((l1+l2)≧L2). An operation is explained below.

The light from the objective lens 35 is deflected by the first reflection mirror 45 and it is directed to the observation lens barrel 39 by the second to fourth reflection mirrors 46–48. An image by the objective lens is focused on an image plane of an eye lens by a relay lens system, not shown. When the objective lens 35 is at the substantially center of the rail 44, the optical axis distance between the objective lens optical axis and the observation optical axis is minimum, and the objective lens unit 36 and the observation optical system unit 37 are deflected with a large angle at the center of rotation guides 36a and 37a. When the objective lens 35 is at one of the opposite ends of the rail 44, the optical axis distance is maximum and the objective lens unit 36 and the observation optical system unit 37 are deflected with a small angle at the center of rotation guides 36a and 37a, or they are aligned straight. Thus, the optical path length is constant even if the objective lens is moved, and both reflection planes of the first and second reflection mirrors 45 and 46 and both reflection planes of the third and fourth reflection mirrors 47 and 48 are maintained parallel. Accordingly, there is now rotation of image and the entire area of the sample can be observed with the same condition.

In the third embodiment, the configuration may be modified similarly to the second embodiment so that the stage 34 is driven left and right with respect to the observer.

What is claimed is:

1. A microscope comprising:
   an objective optical system having an objective optical axis;
   an observation optical system having an observation optical axis parallel to said objective optical axis;
   coupling means for optically coupling said objective optical system with said observation optical system;
   a stage for holding a sample;
   means for rectilinearly moving said stage toward and away from said observation optical axis on a first line perpendicular to and intersecting with said observation optical axis; and
   means for rectilinearly moving said objective optical system on a second line perpendicular to a plane defined by said observation optical axis and said first line.

2. A microscope according to claim 1, further including supporting means for supporting said objective optical system and said observation optical system in spaced relation along a direction of said first line.

3. A microscope according to claim 2, wherein said objective optical system is suspended from said supporting means.

4. A microscope according to claim 1, wherein said coupling means comprises:
   a first reflection mirror reflecting light from said objective optical axis toward said observation optical system;
   a second reflection mirror aligning light reflected from said first reflection mirror with said observation optical axis; and
   a relay optical system having a first optical system and a second optical system disposed between said first and said second reflection mirrors, said first optical system having at least one lens for converting light from said first reflection mirror into parallel rays and said second optical system having at least one lens for focusing light from said first optical system.

5. A microscope according to claim 4, further comprising means for supporting said coupling means, including first supporting means disposed on said objective optical system for supporting said first reflection mirror and said first optical system at a fixed distance, and second supporting means disposed on said observation optical system for supporting said second reflection mirror and said second optical system at a fixed distance, said first supporting means and said second supporting means being relatively movably connected such that a distance between said first optical system and said second optical system is changeable.

6. A microscope according to claim 5, wherein said means for supporting said coupling means further comprises first rotating means supporting said objective optical system for rotation around said objective optical axis, and second rotating means supporting said observation optical system for rotation around said observation optical axis.

7. A microscope according to claim 5, wherein said first supporting means and said second supporting means are connected for relative movement in a direction of an optical axis of said first optical system and said second optical system.

8. A microscope according to claim 4, wherein a first distance between said observation optical axis and said second line remains constant in the direction of said first line, and wherein a second distance between said observation optical axis and said objective optical axis is at least equal to said first distance.

9. A microscope according to claim 8, wherein said relay optical system has a relatively long distance between said first optical system and said second optical system when said second distance is greater than said first distance, and said relay optical system has a relatively short distance between said first optical system and said second optical system when said second distance is equal to said first distance.

10. A microscope according to claim 4, wherein said coupling means further comprises a third reflection mirror and a fourth reflection mirror disposed between said first and said second reflection mirrors, said third reflection mirror reflecting light from said first reflection mirror in a direction parallel to said objective optical axis, and said fourth reflection mirror reflecting light from said third reflection mirror to said second reflection mirror.

11. A microscope according to claim 10, further comprising means for supporting said coupling means, including first rotating means supporting said objective optical system for rotation around said objective optical axis, and second rotating means supporting said observation optical system for rotation around said observation optical axis.

12. A microscope according to claim 11, wherein said means for supporting said coupling means further comprises first supporting means disposed on said objective optical system for supporting said first reflection mirror and said third reflection mirror at a fixed distance, and a second supporting means disposed on said observation optical system for supporting said second reflection mirror and said fourth reflection mirror at a fixed distance, and wherein an end of said first supporting means at which said third reflection mirror is disposed is relatively rotatably connected to an end of said second supporting means at which said fourth reflection mirror is disposed such that a distance between said third reflection mirror and said fourth reflection mirror remains substantially constant.

13. A microscope according to claim 1, wherein said observation optical system further comprises an observation lens barrel having an inclined axis extending along said second line in a plane substantially orthogonal to said first line.

14. A microscope comprising:
   an objective optical system;
   means supporting said objective optical system for movement parallel to one of two orthogonal directions in a plane perpendicular to an optical axis of said objective optical system;
   a stage for holding a sample;
   means for driving said stage parallel to the other of said two orthogonal directions;
   an observation optical system having a fixed optical axis that is parallel to said optical axis of said objective optical system; and
   coupling means for coupling said objective optical system with said observation optical system, said coupling means including relay optical means for forming a relay optical path between said objective optical system and said observation optical system, wherein said relay optical means includes a first optical unit having a first reflection plane for deflecting a light beam from said objective optical system parallel to said perpendicular plane, and a second reflection plane for deflecting a light beam from said first reflection plane parallel to said optical axis of said objective optical system; a second optical unit having a third reflection plane for deflecting a light beam from said second reflection plane parallel to said perpendicular plane toward said observation optical system, and a fourth reflection plane for causing a light beam from said third reflection plane to coincide with said optical axis of said observation optical system; and means coupling said first unit and said second unit for relative rotation around an optical axis between said second reflection plane and said third reflection plane as said objective lens is driven.

15. A microscope according to claim 14, wherein a sum of an optical path length between said first reflection plane and said second reflection plane and an optical path length between said third reflection plane and said fourth reflection plane is equal to or larger than a maximum optical axis length between said objective optical system and said observation optical system.

\* \* \* \* \*